United States Patent [19]

Cangelosi et al.

[11] Patent Number: 5,108,623
[45] Date of Patent: Apr. 28, 1992

[54] MOVING WEB FILTER ASSEMBLY

[75] Inventors: Jerome M. Cangelosi, Mentor-On-The-Lake; James Zgonc, Willowick, both of Ohio

[73] Assignee: Gould Inc., Eastlake, Ohio

[21] Appl. No.: 615,327

[22] Filed: Nov. 19, 1990

[51] Int. Cl.⁵ .............................................. C02F 1/00
[52] U.S. Cl. ............................... 210/744; 210/783; 210/791; 210/400
[58] Field of Search ............... 210/111, 400, 401, 744, 210/783, 791

[56] References Cited

U.S. PATENT DOCUMENTS

| | | | |
|---|---|---|---|
| 3,575,854 | 4/1971 | Richards | 210/50 |
| 3,706,378 | 12/1972 | Marwick | 210/107 |
| 3,910,842 | 10/1975 | Karlson | 210/401 X |
| 4,350,597 | 9/1982 | Seim et al. | 210/710 |
| 4,430,231 | 2/1984 | Bratten | 210/783 |

FOREIGN PATENT DOCUMENTS

| | | |
|---|---|---|
| 49-064521 | 10/1972 | Japan . |
| 58-199009 | 11/1983 | Japan . |
| 1337118 | 9/1987 | U.S.S.R. . |

OTHER PUBLICATIONS

Serfilco—"Automatic Fabric Filtration System," Bulletin F-701D, Jan., 1089.

Primary Examiner—Charles Hart
Attorney, Agent, or Firm—D. Peter Hochberg; Mark Kusner; Louis J. Weisz

[57] ABSTRACT

A system for filtering solid-containing plating waste comprises a reusable filter media belt that travels in a continuous loop between a filter tray, where filtration takes place, and a multi-compartmented cleaning tank where the belt is cleaned for reuse. Each compartment in the tank is substantially closed at its lower end, and open at its upper end. The belt travels in and out of each of the tank compartments in sequence, being subjected to a liquid cleaning treatment in each by contacting sprays and/or bath immersion before being returned to the filter tray for reuse. A wringer is provided at the top of each compartment through which the belt passes before proceeding to the next compartment in order to isolate the treatment liquids from each other.

14 Claims, 10 Drawing Sheets

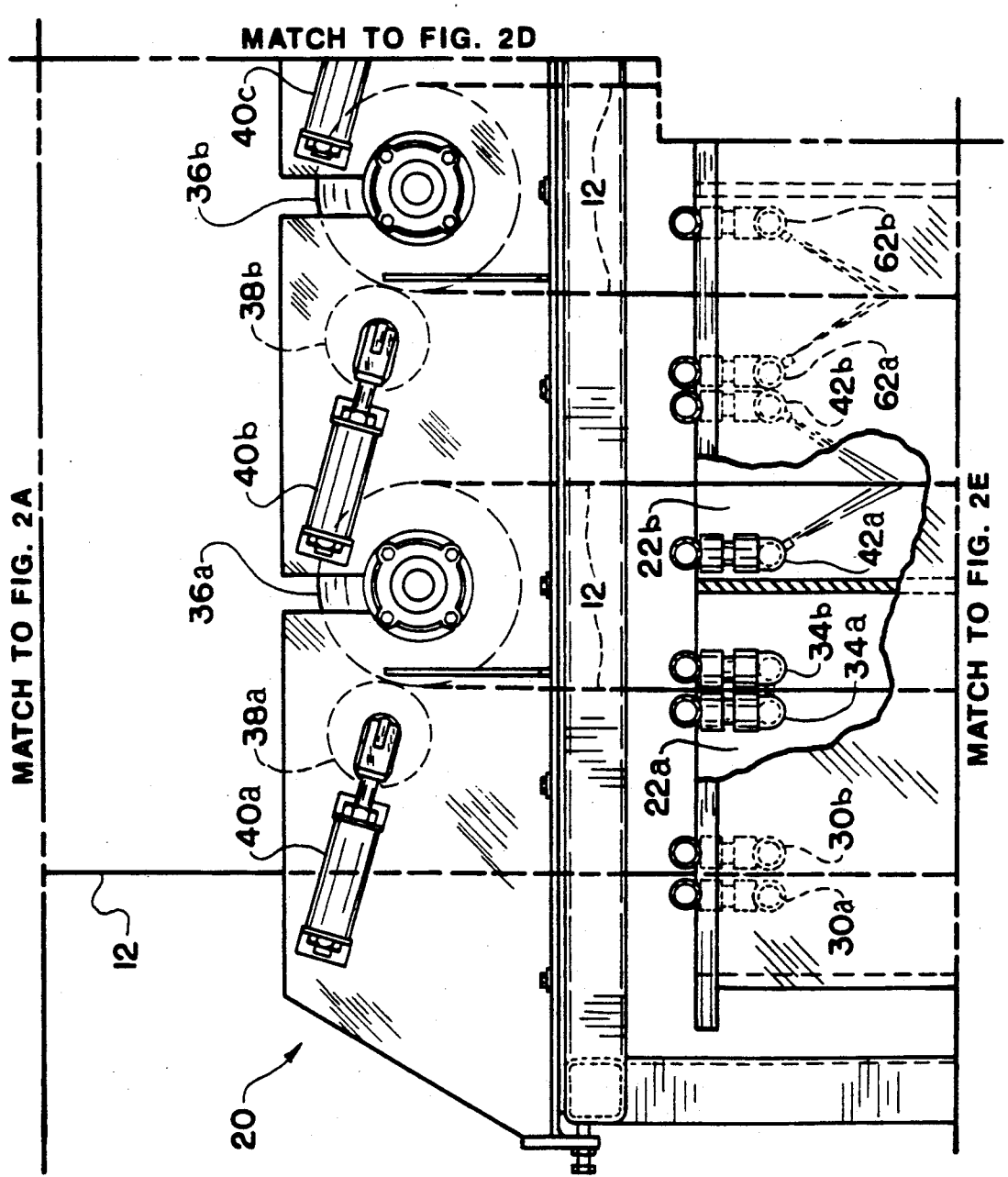

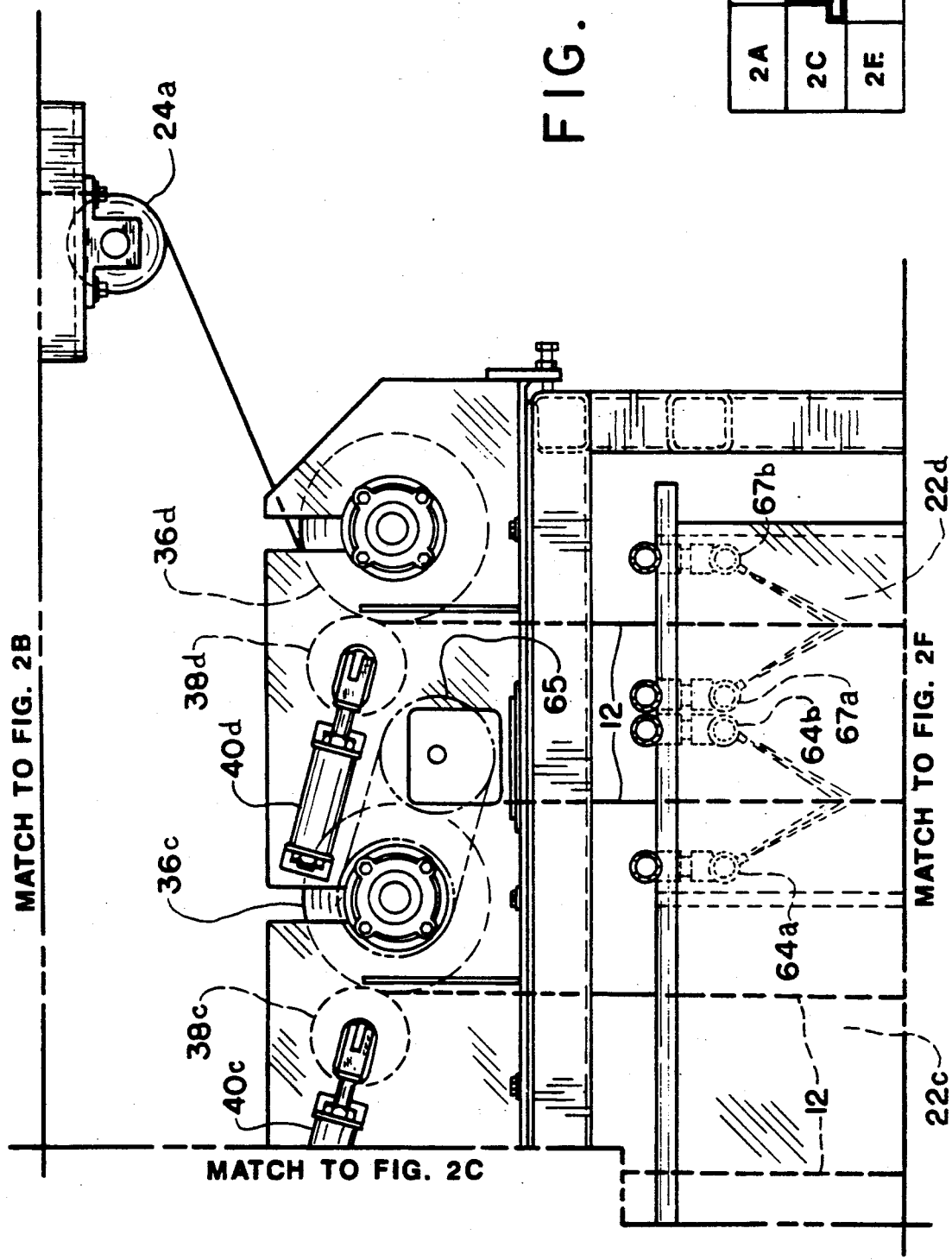

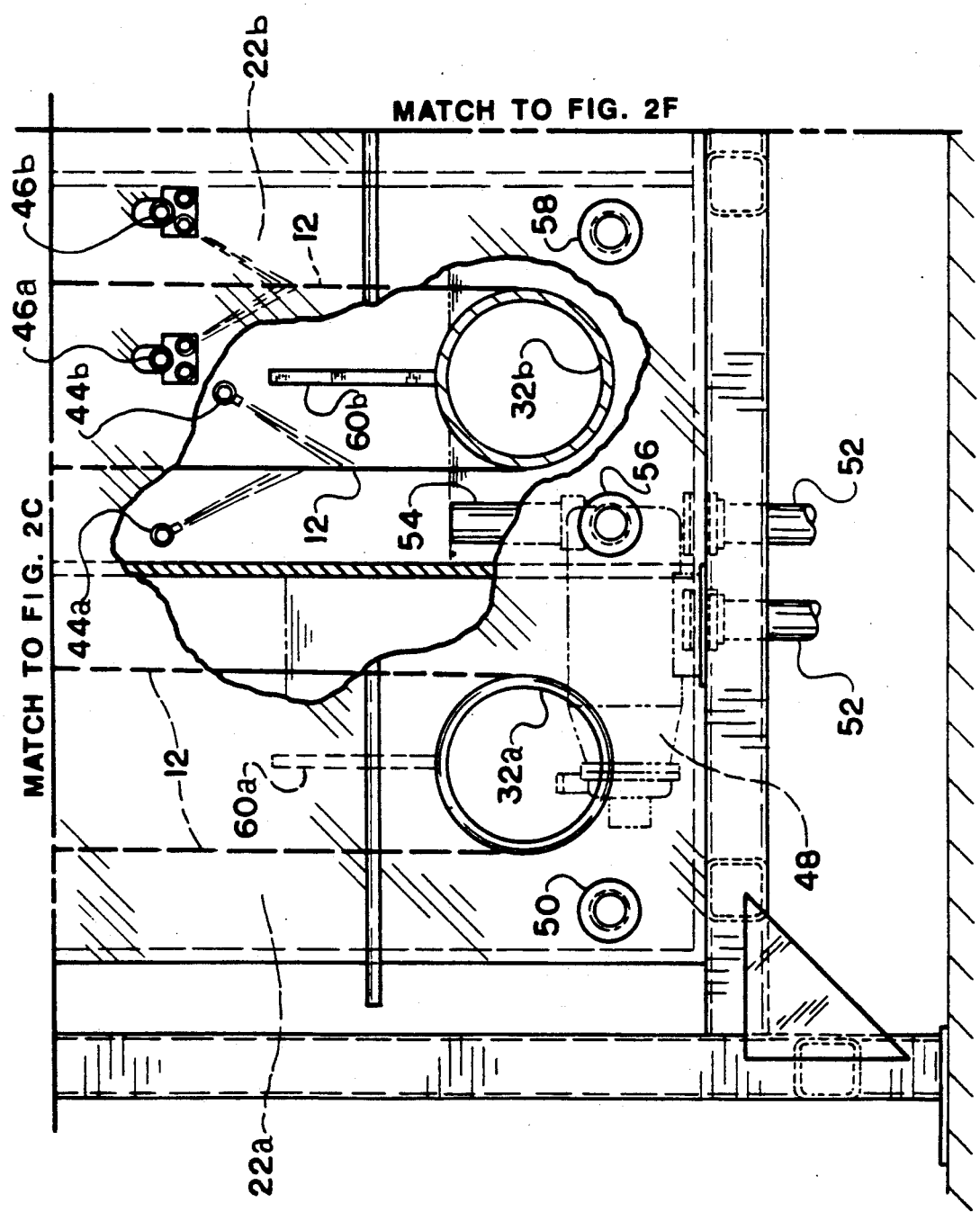

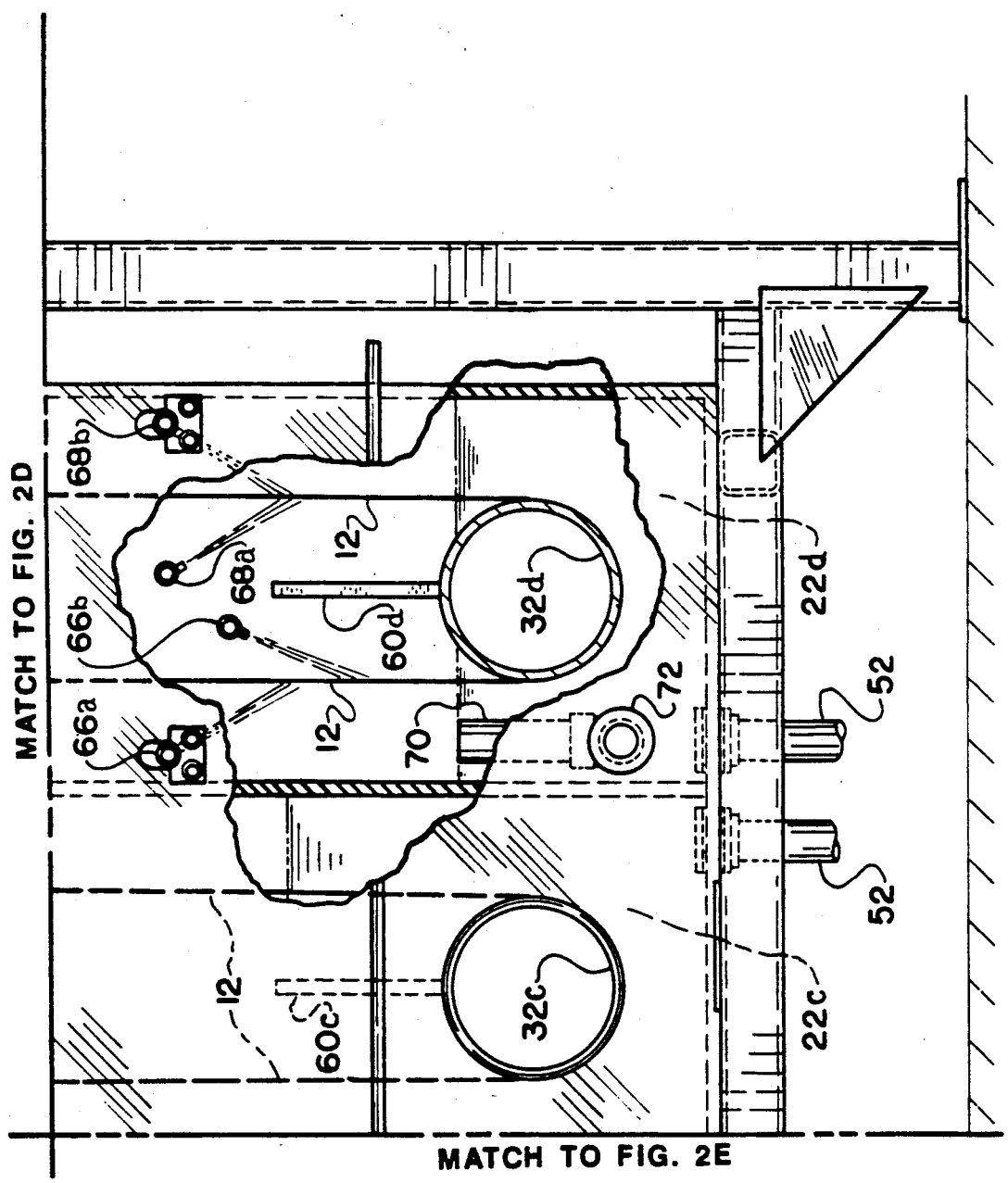

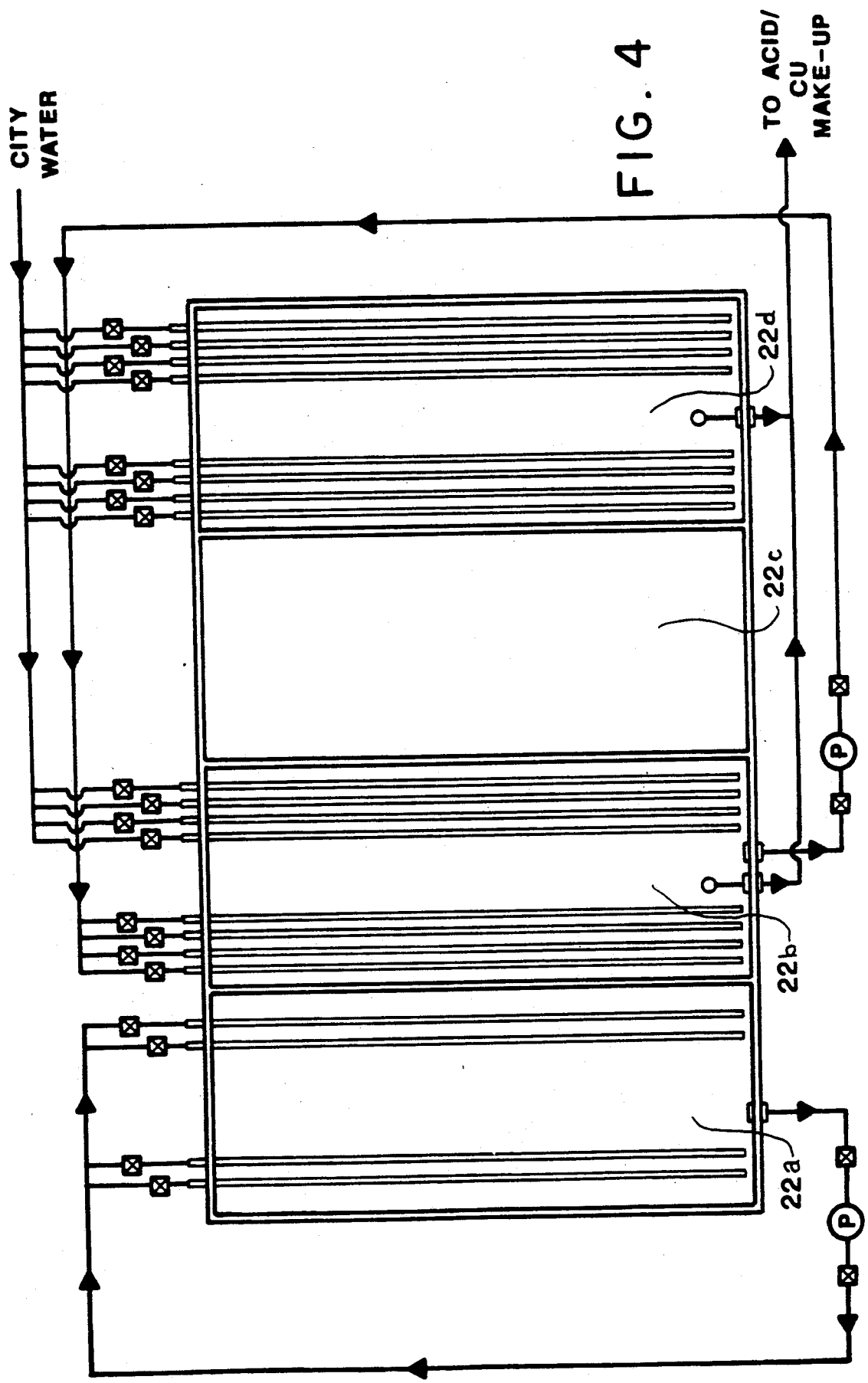

MOVING WEB FILTER ASSEMBLY

TECHNICAL FIELD

This invention relates to moving web filters of the type used to remove relatively small particles from liquids containing them. More particularly, this invention relates to moving web filter assemblies that include an apparatus for continuously cleaning reusable filter webs when the same are employed to remove particles from rinse water waste streams generated in electroplating processes. Specifically, this invention relates to web filter assemblies that include a cleaning device comprising a series of adjacent compartments through which succeeding segments of a continuous web filter loop are sequentially passed, being contacted with cleansing treatment liquids therein.

BACKGROUND OF THE INVENTION

During the course of electroplating metals, the metals undergoing plating are typically subjected to rinsing operations, for example, to remove residual plating chemicals from the surface of the metals. As a consequence of such rinsing operations, considerable volumes of rinse water solutions are generated and these are commonly contaminated with hazardous chemicals. Since the release of such materials to the environment is normally prohibited by law, the waste water streams must be treated prior to their release.

In the case of copper plating processes, for instance, the water used to rinse the metal being plated quickly acquires environmentally unacceptable levels of hazardous substances, including heavy metals such as copper and chromium. These are often disposed of by precipitating the metals as water insoluble metal hydroxides which are subsequently removed primarily by flocculation and clarification through one of several types of gravity separators. However, clarification is basically a "rough in" process which requires final polishing to remove very small metal precipitate fines.

One method of removing the remaining solids has involved the use of a so-called "moving web filter" comprising the gravity filtration of the filtrate derived from a primary separation process through a paper filter media disposed on a supporting, liquid-permeable belt located in the bottom of a filter box or tray. During the secondary filtration process, the contaminated liquid is pumped into the tray where it diffuses across the filter media. Separation of the solids begins immediately by gravity flow through the media and its supporting belt to a filtrate tank positioned below the tray. Solids collect on the media until its pores become plugged, the level of the contaminated liquid then rising until a float control is activated. In response to a signal from the control, the motor-driven belt then stretches fresh media across the bottom of the tray, while the filtered solids are dragged over an incline which drains liquid off before collecting the separated solids and spent media in a "sludge box" provided for the purpose. A filter system of the type described, for example, is that manufactured by Serfilco Ltd. of Glenview, Ill., identified by that company as "an automatic fabric filtration system".

While the apparatus described performs the filtering operation in a satisfactory manner, it has the disadvantage of producing a large amounts of contaminated filter media, thus creating a disposal problem since the media is itself classified as a hazardous waste material due to the accumulation of the filtered solids in its pores.

BRIEF DISCLOSURE OF THE INVENTION

In view of the preceding, therefore, it is a first aspect of this invention to provide an improved apparatus for treating electroplating rinse water wastes.

A second aspect of this invention is to provide a method for facilitating the treatment of electroplating wastes in an environmentally acceptable fashion.

An additional aspect of this invention is to eliminate any need for a disposable filter media of the type previously associated with moving web filters.

Another aspect of this invention is to provide a moving web filter whose filter media is continuously processed for reuse.

A further aspect of this invention is to provide an apparatus for continuously cleaning the filter media of a moving web filter.

Still another aspect of this invention is to provide a moving web filter that includes a reusable filter media belt which moves in a closed loop between a filtration mode, and a cleaning mode.

Yet a further aspect of this invention is to provide a moving filter web assembly that includes a multi-compartmented filter media treatment device in which the filter media is subjected to cleansing treatment in each of its several compartments.

The preceding and additional aspects of the invention are provided by a moving web filter apparatus comprising: a filtration chamber; a reusable filter media belt; belt transport means; a belt cleaning tank; and media belt transport control means. The belt is configured in a continuous loop, part of which is located in the filtration chamber where it filters contaminated liquid deposited therein, with another part of the belt being located in the cleaning tank where it is cleansed from contaminating solids. All segments of the belt are sequentially transported between the filtration chamber and the cleaning tank by means of the belt transport means, activated in response to signals received from the belt transport control. The cleaning tank comprises multiple compartments through which all segments of the belt are sequentially moved, and in each of which a belt cleaning treatment is provided.

The preceding and still other aspects of the invention are provided by a reusable continuous loop filter media belt cleaning device for a moving web filter apparatus comprising: a multi-compartment belt treatment tank; belt transport means; and belt wringer means. The compartments are substantially closed at their lower end, and have an open upper end with wringer means being located adjacent to their upper end. The transport means are adapted to move the segments of the belt sequentially through each of the compartments, and through the compartment's wringer means, thereby permitting the belt segments to receive a cleaning treatment in each of the compartments, with the treating liquids associated with such treatments in the respective compartments being substantially isolated from each other.

The preceding and further aspects of this invention are provided by a method for filtering electrolytic plating waste mixtures comprised of liquids and solid metal hydroxides which includes filtering the mixtures in an apparatus comprising: a filtration chamber; a reusable filter media belt; belt transport means; a belt cleaning tank; and belt transport control means. The belt is configured in a continuous loop, part of which is located in the filtration chamber, and another part of which is located in the cleaning tank. All parts of the loop are sequentially transported between the filtration chamber and the cleaning tank by the belt transport means in response to signals received from the belt transport control means. The belt cleaning tank comprises multiple compartments in which the belt is subjected to cleaning treatment after the waste mixtures have been filtered therethrough in the filtration chamber.

BRIEF DESCRIPTION OF THE DRAWINGS

FIG. 2C is an enlarged partial view, including a broken-out section of the assembly shown in FIG. 2;

FIG. 2D is an enlarged partial view of the assembly shown in FIG. 2;

FIG. 2E is an enlarged partial view, including a broken-out section of the assembly shown in FIG. 2;

FIG. 2F is an enlarged partial view, including a broken-out section of the assembly shown in FIG. 2;

FIG. 4 is a schematic drawing of the cleaning tank spray and drain system of the invention.

DETAILED DESCRIPTION OF THE INVENTION

As previously described, moving web filters of the type known in the prior art eventually become plugged or "blinded" with the particles being filtered, necessitating their replacement. Since the filters are commonly made of inexpensive material such as paper, the cost of replacement is not a significant problem. However, in view of the growing concern with waste disposal, particularly the disposal of waste contaminated with hazardous materials such as heavy metals of the type used in electroplating operations, finding a place to dispose of the spent media has itself become a problem. Currently, for example, the disposal of such materials in landfills has been banned by the Environmental Protection Agency.

The invention described herein eliminates the disposal problem through the use of a continuous loop filter media which travels between a filter tray where filtration takes place, and a cleansing tank where particulate materials blinding the filter media are removed and the filter media recycled back to the filtration tray for reuse.

In carrying out the treatment of electrolytic plating waste, the metals contained in the plating effluent are converted into a water-insoluble form, and the resulting precipitate is subjected to a primary filtration in which the coarse particles are removed, with the effluent from such filtration being again filtered in a secondary filter such as the moving web filter assembly of the invention. In the filter assembly of the invention, the filter media is cleansed in a cleaning device and recycled to the filter tray, while the liquid filter effluent is discharged to the sewer.

Figure 1:
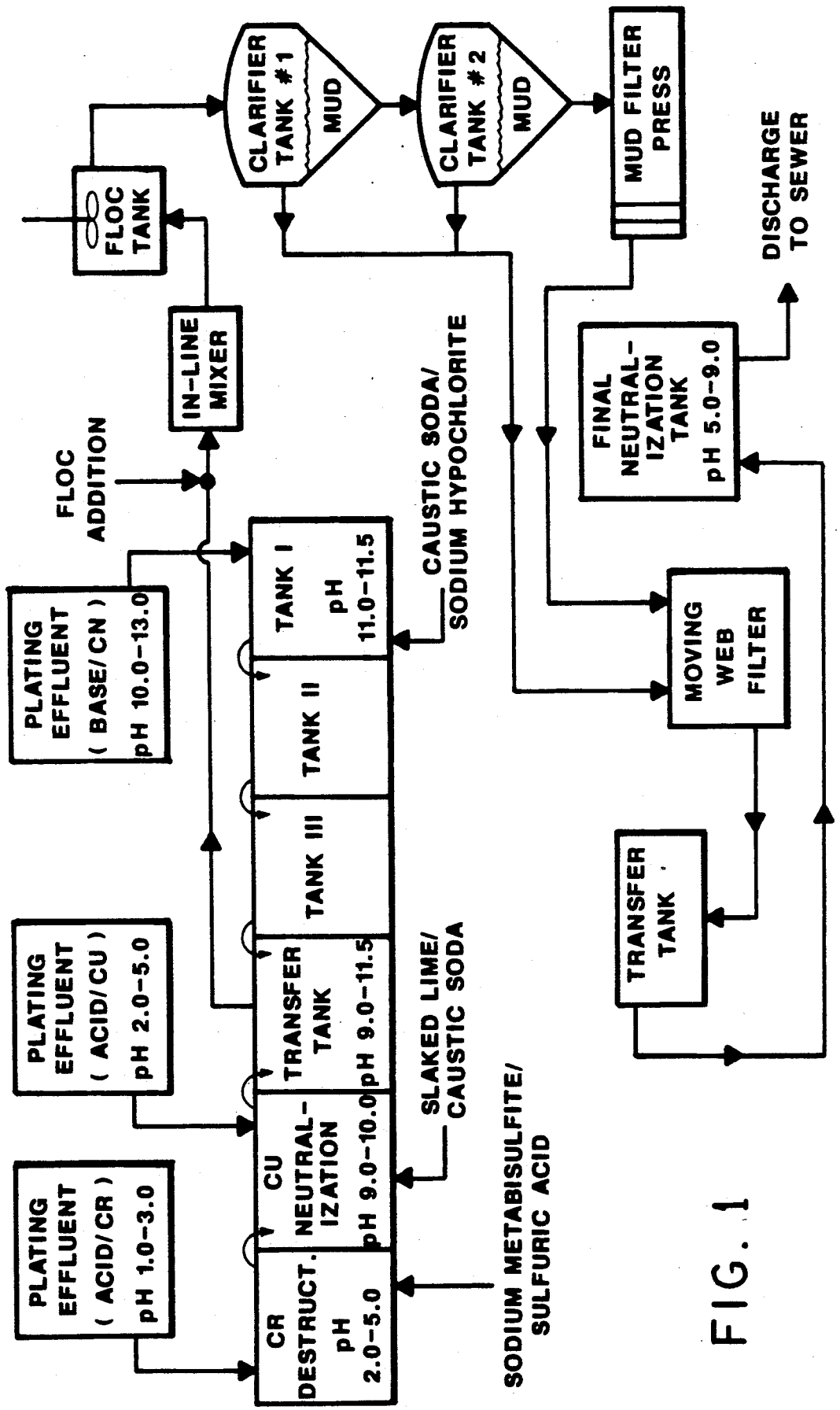
FIG. 1 is a block diagram showing the treatment of electroplating waste in a process that includes filtration employing a moving web filter.

The process is more particularly described in FIG. 1 which is a block diagram showing the treatment of the electroplating waste in a process that includes filtration employing a moving web filter assembly of the invention. Referring to the Figure, three electroplating effluent waste streams are treated, e.g., an acid/chromium stream, an acid/copper stream, and a basic/cyanide stream. In the course of the treatment, the acid/chromium stream is treated with sodium metabisulfite and sulfuric acid. The treatment results in the reduction of the chromium from its hexavalent state to its trivalent state. The reduced chromium stream, together with the acid/copper stream is then treated with slaked lime or caustic soda, causing the precipitation of both metals as insoluble hydroxides. The treatments described are carried out in vessels represented by the correspondingly labeled blocks in the diagram of the figure.

The basic/cyanide solution is treated with caustic soda and sodium hypochlorite to convert the cyanide to water-soluble sodium cyanate and complexed metal cyanides to insoluble metal precipitates, the reaction being completed as the reactants are pumped through a series of interconnected vessels as shown.

Following the chemical treatments described, the treated streams are moved to a transfer tank and transferred to an in-line mixer where a flocculating agent is added to assist in the subsequent, primary separation process. Suitable flocculents include, for example, materials such as lime, alum, ferric chloride and the like.

Figure 2:
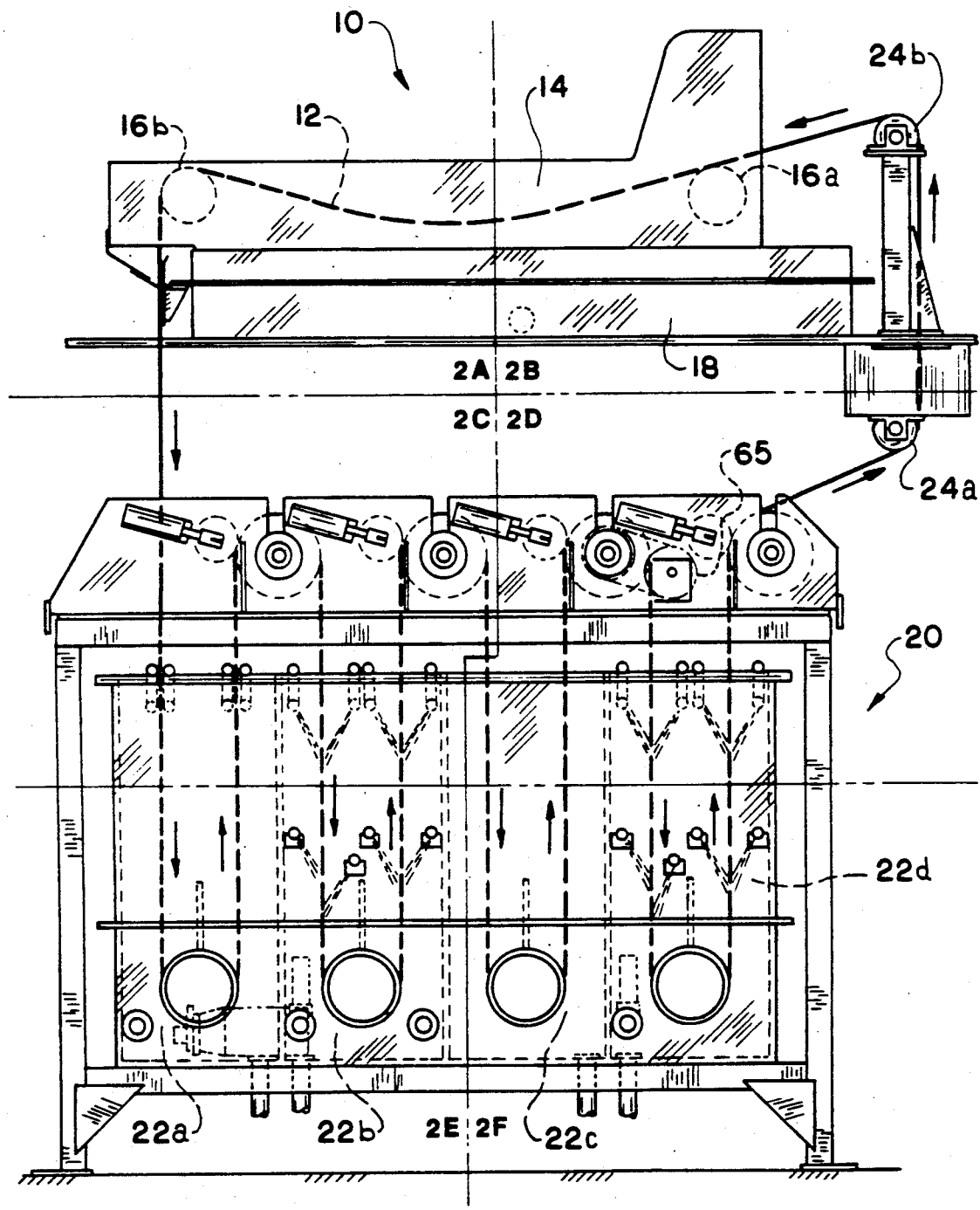
FIG. 2 is a side elevation of a moving web filter assembly of the invention.

From the in-line mixer, the stream is pumped to an agitated floc tank where flocculation of the metal hydroxides is completed. The flocced material is then passed to a first clarifier tank where the solids are allowed to settle before being fed to a second clarifier tank in which further solid settling takes place. The settled solids then proceed to a filter, typically of the plate and frame press variety, where the solid sludge or "mud" is removed. Effluent from each of the clarifier tanks, and from the filter then flows to a moving web filter system of the invention where a final or secondary filtration takes place. The filtrate from the latter filtration is thereafter accumulated in a transfer tank before being sent to a final neutralization tank where its hydrogen ion concentration, pH, is adjusted to from between about 5 to 9 and then discharged to the sewer. FIG. 2 is a side elevation of the moving web filter assembly of the invention. The assembly comprises a moving web filter, generally 10, and a filter belt cleaning device, generally 20.

The moving web filter 10 comprises a filtration tank 14 positioned over a filtrate tank 18. A filter media belt 12 is introduced into the tank after passing over guide rollers 24a and 24b, moving through the tank over transport rollers 16a and 16b.

After passing through the filter tank in the direction of the associated arrows, the filter media belt 12 proceeds downwardly to the filter belt cleaning device 20 located below it. As shown, all segments of the belt pass sequentially through a series of compartments, i.e., 22a, an acid wash compartment; 22b, a first water wash compartment; 22c, a caustic wash compartment; and 22d, a second water wash compartment; before being looped back to guide roller 24a.

The compartments 22 of the cleaning device 20 are substantially closed at their lower end, and open at their upper end, allowing the media belt to pass in and out of each of the compartments without impairing the ability of the compartments to retain liquids.

The filtrate received from the clarifier tanks and the filter press described in connection with FIG. 1, and still containing fine particles which must be removed prior to discharge of the liquids to the sewer, is fed into the filtration tank 14. The contaminated material flows by gravity through the filter media belt 12, with the filtered liquid being collected in filtrate tank 18. As the filtration proceeds, the belt 12 gradually becomes clogged or "blinded" with fine particles, reducing the filtration rate. As a consequence, the level of unfiltered liquid rises in the tank, the limit of desirable rise eventually being detected by a media belt transport control device, not shown. The control means can be a simple float device, a capacitance detector, or other equivalent device of the types well known in the trade. At this point, the control device activates a drive motor 65 which causes fresh media belt to be introduced into the filtration tank, increasing the filtration rate and dropping the level of the contaminated liquid to a desirable lower detection point of the control device. Movement of the belt then ceases, and filtration continues until the level in the filtration tank again rises to the upper level set point of the control device, the sequence thereafter being repeated.

As the belt moves through the filtration tank as described, a segment of the belt also feeds downwardly into a first of the compartments contained in the belt cleaning device 20. In the first, or acid compartment 22a, the belt is contacted with acid which dissolves the metal hydroxide particles blinding the belt. The belt proceeds from the first to the second compartment, 22b, where it is treated with a water wash to flush residual acid. The belt then enters the third compartment 22c, in which it is contacted with caustic soda to neutralize any remaining traces of acid, before finally entering the fourth compartment 22d, where it receives another water wash.

The treatments described take the form of liquid sprays and immersion in liquid baths, activation of the sprays preferably being triggered intermittently to coincide with movement of the belt, a technique accomplished with control interconnections not shown, but which are well understood in the art.

Figure 2A:
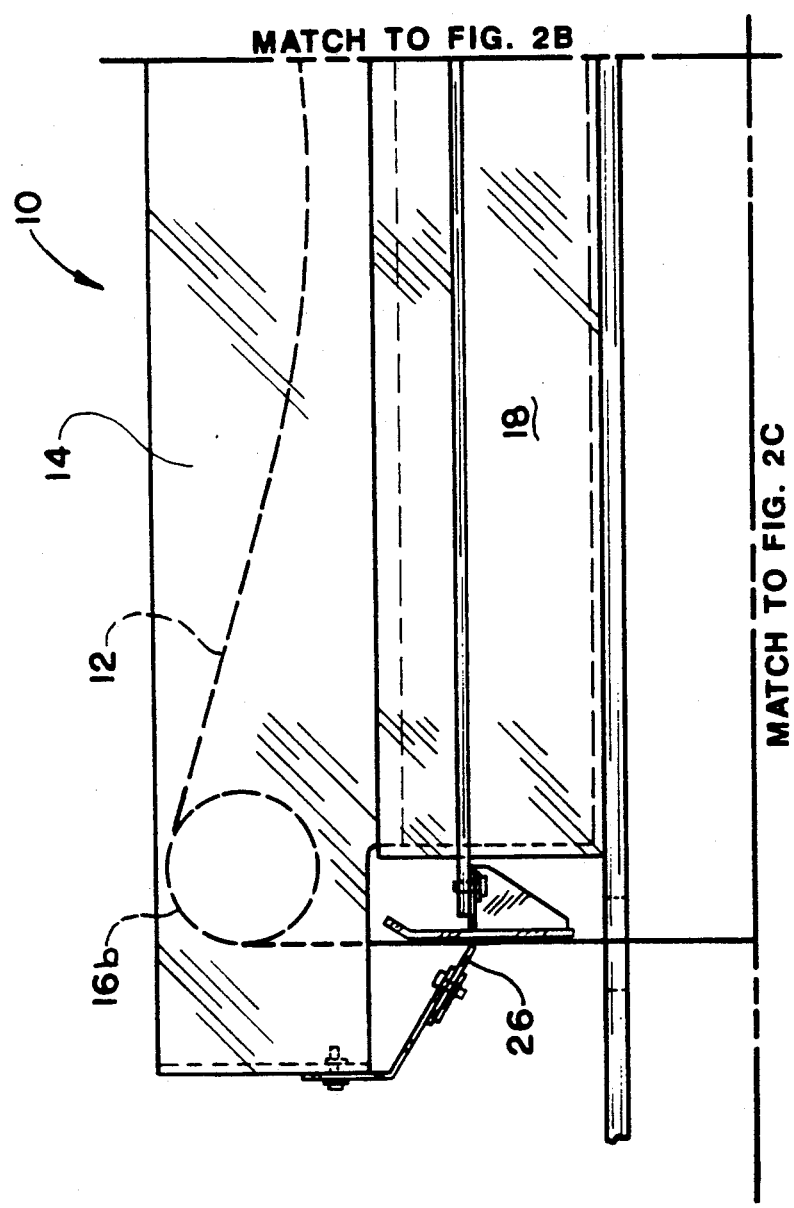
FIG. 2A is an enlarged partial view of the assembly as shown in FIG. 2.

FIG. 2A is an enlarged partial view of the assembly as shown in FIG. 2. As shown, the filter media belt 12 leaves the filtration tank over transport roller 16b, proceeding downwardly where it comes into contact with sludge wiper blade 26. The purpose of the wiper blade is to remove gross amounts of solids adhering to the belt so as to reduce the cleansing load imposed upon the filter belt cleaning device 20. The filtrate leaves filtrate tank 18 through a discharge port 28, better seen in FIG. 2B.

The filter media belt 12 may be fabricated from any flexible material of a type unaffected by the cleaning chemicals to which it is subjected, and may be of a woven or unwoven type. The particle retention characteristics of the belt will be selected to retain thereon whatever particle sizes are desired. Within such considerations, plastic belts, particularly those made from polyolefins, especially polypropylene, have been found to produce satisfactory filtering results. In a particularly preferred mode, filter media belts made from mixtures of polypropylene and felt are employed. Among suitable media belts may be mentioned, for example, that made by Lamports Filter Media Inc., and marketed by them as their product 7403; as well as products of the National Filter Company, for example, their medias 226-029-03 and 226-061-00, and others.

With respect to the filtration characteristics of the filter media belt 12, it has been found that in those instances where the porosity of the belt is such that if 90% of particles in the filtrate are less than 5 microns, the concentration of copper in the filtrate is usually no more than about 0.5 ppm. In those cases in which at least about 90% of the particles in the filtrate have a size less than about 10 microns, the copper concentration in the filtrate is normally in the order of 0.9 ppm.

Figure 2B:
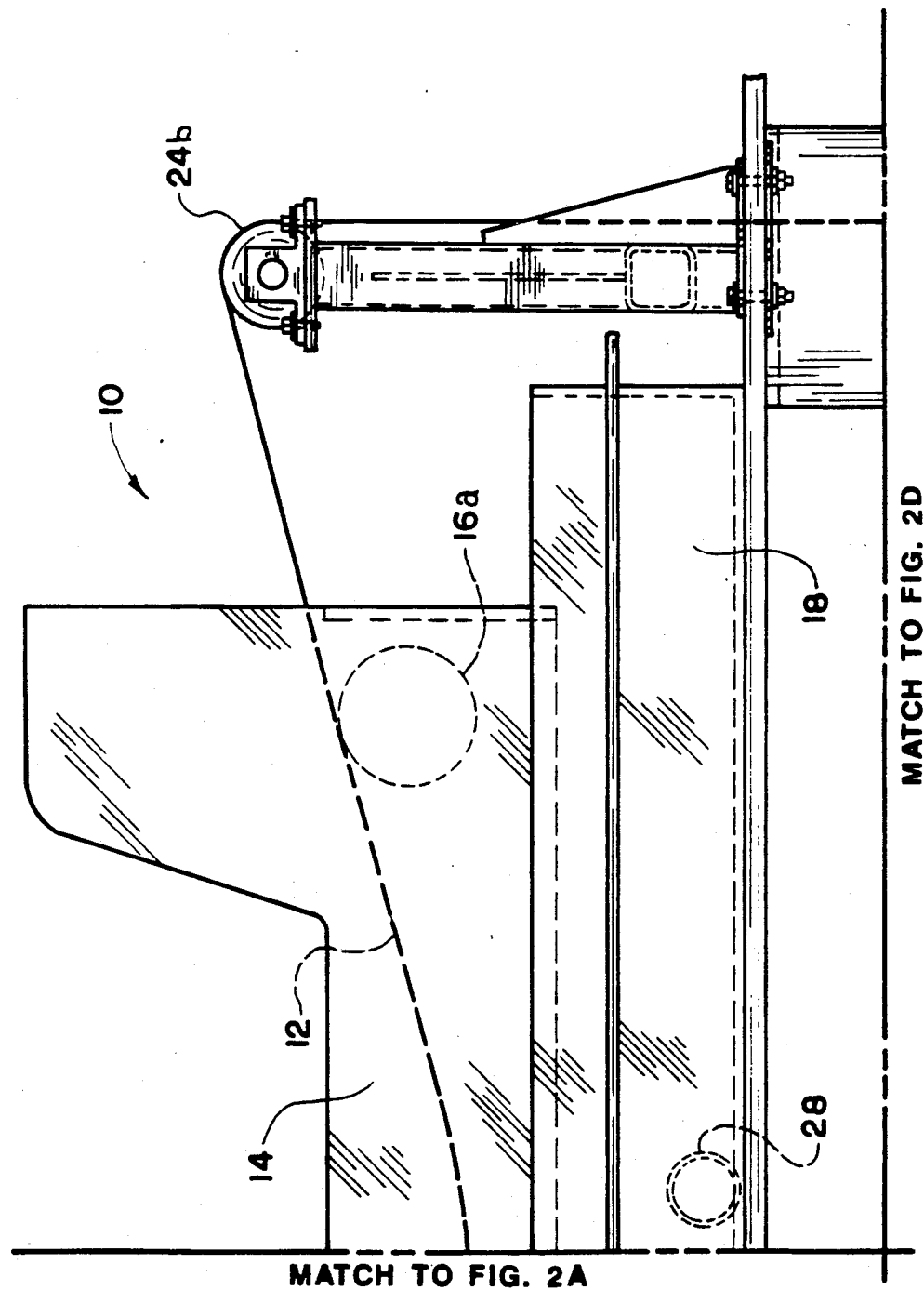
FIG. 2B is an enlarged partial view of the assembly as shown in FIG. 2.

FIG. 2B is an enlarged partial view of the assembly shown in FIG. 2. As illustrated, the filter media belt 12 enters the filtration tank 14 from guide roller 24b, the media belt being supported in the tank by transport roller 16a. Filtrate passing through the media belt 12 is collected in filtrate tank 18 where it is discharged through filtrate discharge port 28, proceeding from there ultimately to the final neutralization tank and subsequent discharge to the sewer.

FIG. 2C is an enlarged partial view, including a broken-out section of the assembly shown in FIG. 2. In the Figure, the filter media belt 12 proceeds downwardly into compartment 22a, past acid spray pipes 30a and 30b where acid is sprayed onto both sides of the belt. As it leaves compartment 22a, the belt 12 passes through additional acid sprays from acid spray pipes 34a and 34b, after which it is wrung by being squeezed in a wringer comprised of upper filter media belt roll 36a and pinch roll 38a, the latter being forced toward the former by air "pinch" cylinder 40a.

After passing through the wringer, the filter media belt 12 passes downwardly into compartment 22b, past water sprays directed upon it from upper water spray pipes 42a and 42b. The belt leaving the compartment 22b receives an additional water spray from upper water spray pipes 62a and 62b. Again the media belt leaving the compartment is squeezed between upper filter media belt roll 36b and pinch roll 38b, urged by air pinch cylinder 40b.

While hydrochloric acid is the preferred acid for use in compartment 22a, additional acids, for example, nitric, sulfuric, phosphoric and others may also be employed.

In order to withstand chemical attack, and although other well known resistant materials may be employed, typically, the filter belt cleaning device 20 will be made from a plastic, for example, polypropylene. It is also preferred that the belt rollers 36 and pinch rollers 38 be rubber covered. Plastic piping, for instance, polyvinyl chloride may be used to fabricate the spray pipes and the filter belt guides 32, which latter are better seen in FIGS. 2E and 2F.

FIG. 2D is an enlarged partial view of the assembly shown in FIG. 2. The Figure shows the filter media 12 entering compartment 22c, where it is immersed in a bath of sodium hydroxide, thereafter leaving the compartment between upper filter media belt roll 36c and pinch roll 38a whose pressure against the belt roll is maintained by air pinch cylinder 40c.

While spray pipes can also be provided for caustic treatment in compartment 22c if desired, the treatment process can be satisfactorily carried out without sprays. In addition, the elimination of the sprays avoids undesirable misting of the caustic solution.

Although sodium hydroxide, or caustic soda, is the preferred neutralization base, additional useful bases include potassium hydroxide, calcium hydroxide, sodium carbonate and others.

Upon leaving compartment 22c, the media belt 12 enters compartment 22d where it receives a further water wash to remove residual caustic by means of water sprayed from upper water spray pipes 64a and 64b. The media belt 12 leaving the compartment receives a final water wash from upper water spray pipes 67a and 67b, after which it is wrung between upper filter media belt roll 36d and pinch roll 38d, the latter being pushed against the former by air pinch cylinder 40d. The media belt then leaves the belt cleaning device 20, proceeding upwardly to guide roller 24a.

The concentration of the acid used to wash the media belt may be varied with a considerable range; however, it has been found that a useful composition constitutes a mixture of commercial muriatic acid and water combined in about equal volume amounts. Similarly, the concentration of caustic soda may be varied within a broad range; however, a mixture containing about 5%, by weight, of sodium hydroxide has been found to be satisfactory for neutralization purposes.

FIG. 2E is an enlarged partial view, including a broken-out section of the assembly shown in FIG. 2. The media belt 12 is shown in the Figure descending to the lower end of the compartment 22a, traveling around filter belt guide 32a, positioned by support gusset 60a, before proceeding back to the upper region of the compartment. As can be seen in the broken away section of the figure, a level of acid is maintained in the compartment, its height being controlled by the rate of acid withdrawn from acid recirculation outlet port 50 and recirculated to the acid spray pipes previously described by means of acid recirculation pump 48. A compartment drain 52 is provided for those occasions when it is necessary to clean the compartment.

After leaving compartment 22a, the media belt 12 descends into compartment 22b, passing beneath filter belt guide 32b, supported by support gusset 60b, and rising again to the upper regions of the compartment. As the belt media travels downwardly and upwardly in the compartment it passes through additional water sprays provided by lower water spray pipes 44a and 44b during the belt's downward travel, and 46a and 46b as it proceeds upwardly again. A water level is maintained in the compartment by liquid level standpipe 54, overflow water leaving the tank through compartment outlet port 56, and subsequently being used for plating solution make-up purposes. Water is also withdrawn from water recirculation outlet port 58, which is employed for wash water recirculation purposes as explained in more detail in connection with FIG. 4. A drain 52 is provided for compartment cleaning purposes.

FIG. 2F is an enlarged partial view, including a broken-out section of the assembly shown in FIG. 2. In the caustic compartment 22c, the filter media belt 12 travels downwardly beneath, and in contact with filter belt guide 32c before rising upwardly to the top of the compartment. An initial level of caustic is established in the compartment at the outset of the filtering operation, and as in the case of the acid solution, it need not be replaced until testing carried out at periodic intervals indicates a loss of strength. As in the case of the other compartments, a compartment cleaning drain 52 is provided, and the filter belt guide is supported by a gusset 60c.

In compartment 22d, the media belt 12 passes downwardly, proceeding around filter belt guide 32d, supported by support gusset 60d, before rising to the top of the compartment. The media belt passes through sprays directed from lower water spray pipes 66a and 66b as its descends into the compartment, and through water sprays directed from lower water spray pipes 68a and 68b as it rises upwardly in the compartment. A water level is maintained in the compartment by liquid level standpipe 70, overflow water leaving the compartment through compartment outlet port 72 being used for plating solution make-up purposes. As in the case of the other compartments, a compartment cleaning drain 52 is provided.

Figure 3:
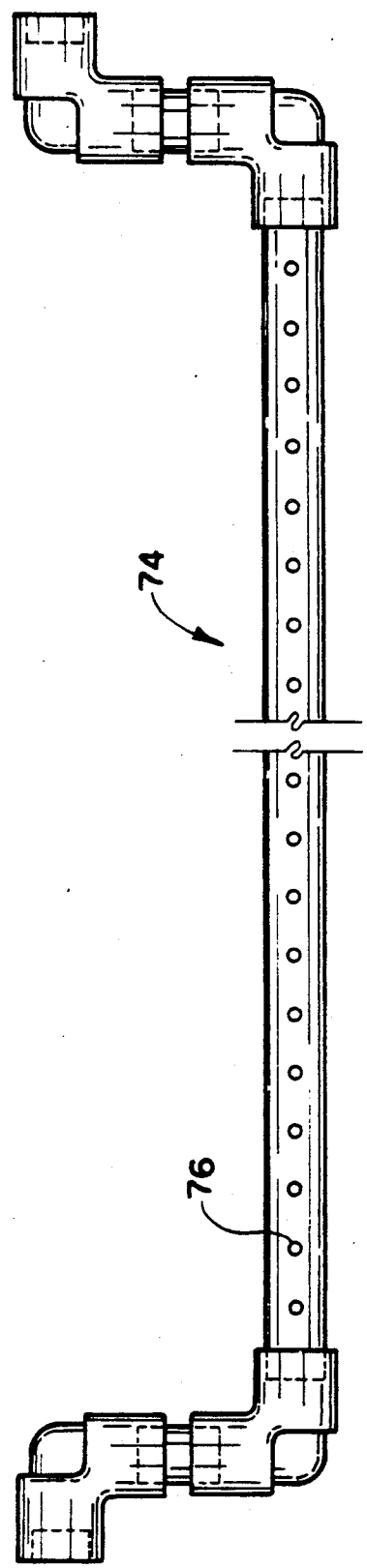
FIG. 3 is an acid spray pipe of the media belt cleaning device of the invention.

FIG. 3 is an acid spray pipe 74 of the media belt cleaning device of the invention, provided with spray outlets 76. If desired, the spray outlets may be furnished with spray nozzles, not shown in the figure. The spacing of the nozzles is relatively unimportant, however, in the case of the acid spray pipes, the outlets are typically spaced about one inch apart, while in the case of the water spray pipes, the outlets are often spaced about 10 inches apart.

Although a "U"-shaped spray pipe is illustrated, such a configuration is not mandatory, straight pipes also being satisfactory. FIG. 2, for example, shows the employment of U-shaped pipes as upper sprays, while straight pipes are used for the lower sprays.

FIG. 4 is a schematic drawing of the cleaning tank spray and drain system of the invention. The figure shows the recirculation of acid in compartment 22a, as well as details of the water circulation in compartments 22b and 22d. With respect to the water treatments, various circulation systems can be employed. For example, fresh water may be supplied to all the sprays, or in the case of the figure, fresh water may be supplied to the sprays on the belt exit side of the compartment 22b, and withdrawn from the bottom of the compartment, being recirculated to supply the sprays on the belt-entering side of the compartment. This is a preferred mode, since among others things recirculation conserves water and reduces the amount that must be ultimately discharged to the environment.

While in accordance with the patent statutes, a preferred embodiment and best mode has been presented, the scope of the invention is not limited thereto, but rather is measured by the scope of the attached claims.

What is claimed is:

1. A moving web filter apparatus for filtering contaminating solids from contaminated liquids generated by electrolytic plating processes comprising:
    a filtration chamber;
    a reusable filter media belt;
    belt transport means;
    a belt cleaning tank; and
    media belt transport control means, said belt being configured in a continuous loop, part of which is located in said filtration chamber where it filters contaminated liquids deposited therein, and another part of which is located in said cleaning tank where it is cleansed of contaminating solids, all segments of said belt being sequentially transported between said chamber and said tank by said transport means in response to signals received from said belt transport control, and said cleaning tank comprising multiple compartments having a substantially closed lower end and an open upper end through which all segments of the belt are sequentially moved, and in each of which a belt-cleaning treatment is provided, said treatments comprising acidification, neutralization, and washing treatments, each of said treatments being conducted in separate compartments and said acidification preceding said neutralization.

2. A filter apparatus according to claim 1 wherein said belt transport control means comprises means for detecting pre-determined levels of the contaminated liquid in said filtration chamber, and means for generating a signal following such detection.

3. A filter apparatus according to claim 1 in which said belt is a liquid permeable fabric comprising a mixture of polypropylene fibers and felting.

4. A cleaning tank according to claim 1 in which said filter apparatus contains four compartments in a first of which said belt is initially treated with hydrochloric acid; in a second of which said belt is next treated with water; in a third of which said belt is subsequently treated with sodium hydroxide, and in a fourth of which said belt is thereafter again treated with water.

5. A filter apparatus according to claim 1 wherein at least some of said compartments include spray outlets for directing said treating liquids onto said belt.

6. A reusable, continuous loop filter media belt cleaning device for a moving web filter apparatus comprising:
a reusable filter media belt;
a multi-compartment belt treatment tank for removing contaminating solids from said belt;
belt transport means; and
belt wringer means, said compartments being substantially closed at their lower end, and having an open upper end; said wringer means being located adjacent the upper end of said compartments, and said transport means being adapted to move segments of said belt sequentially through each of said compartments, and through said compartments' wringer means,
thereby permitting said belt segments to receive a cleaning treatment in each of said compartments while substantially isolating the treating liquids associated with said treatments in the respective compartments from each other.

7. A device according to claim 6 in which said wringer means comprises two adjacent rolls that squeeze said belt as it passes through the nip formed between the rolls.

8. A device according to claim 6 wherein at least some of said compartments include spray outlets for directing said treating liquids onto said belt.

9. A method for removing solids from liquids contaminated therewith by processing said liquids through a moving web filter apparatus according to claim 1.

10. A method for filtering electrolytic plating waste mixtures comprised of liquids and solid metal hydroxides which includes filtering said mixtures in an apparatus comprising:
a filtration chamber;
a reusable filter media belt;
belt transport means;
a belt cleaning tank;
belt transport control means; and
belt wringer means, said media belt being configured in a continuous loop, part of which is located in said filtration chamber, and another part of which is located in said cleaning tank, all parts of said loop being sequentially transported between said chamber and said tank by said belt transport means in response to signals received from said belt transport control means, and said belt cleaning tank comprising multiple compartments closed at their lower end, but having an open upper end in which said belt is subjected to separate cleansing treatments in each of said compartments after said waste mixtures have been filtered therethrough in said filtration chamber, said belt being wrung by said wringer means as it leaves one compartment and before it enters the next compartment.

11. A method according to claim 10 in which said cleansing treatments comprise dissolving metal hydroxides deposited on said media belt during said filtration by acid treatment, neutralizing residual acid remaining on said belt after the acid treatment, and washing the belt with water, each of said treatments being carried out in separate ones of said compartments.

12. A method according to claim 11 in which said belt enters each of said compartments in a vertical downward direction, passing beneath and in contact with a curved guide surface positioned in the bottom of said compartment, and being thereafter withdrawn from said compartment in an upward, vertical direction through said belt wringer means.

13. A method according to claim 12 in which at least some of said compartments include spray outlets for directing treating liquids onto said belt.

14. A reusable, continuous loop filter media belt cleaning device for a moving web filter apparatus employed in connection with filtering contaminating solids from contaminated liquids generated by electrolytic plating processes comprising:
a reusable filter media belt;
a multi-compartment belt treatment tank;
belt transport means; and
belt wringer means, said compartments being substantially closed at their lower end, and having an open upper end; said compartments being adapted to provide said belt with cleaning treatments, said treatments comprising acidification, neutralization and washing treatments, each of said treatments being conducted in a separate compartment and said acidification preceding said neutralization; said wringer means being located adjacent the upper end of said compartments, and said transport means being adapted to move segments of said belt sequentially through each of said compartments, and through said compartments' wringer means, thereby permitting said belt segments to receive a cleaning treatment in each of said compartments while substantially isolating the treating liquids associated with said treatments in the respective compartments from each other.

* * * * *